(12) United States Patent
Lee et al.

(10) Patent No.: US 8,564,556 B2
(45) Date of Patent: Oct. 22, 2013

(54) DISPLAY DEVICE HAVING CAPACITIVE TOUCH SCREEN

(75) Inventors: Hee Bum Lee, Gyunggi-do (KR); Kyong Soo Chae, Gyunggi-do (KR); Yun Ki Hong, Gyunggi-do (KR); Yong Soo Oh, Gyunggi-do (KR); Jong Young Lee, Gyunggi-do (KR)

(73) Assignee: Samsung Electro-Mechanics Co., Ltd., Suwon, Gyeonggi-Do (KR)

( * ) Notice: Subject to any disclaimer, the term of this patent is extended or adjusted under 35 U.S.C. 154(b) by 324 days.

(21) Appl. No.: 12/833,225

(22) Filed: Jul. 9, 2010

(65) Prior Publication Data
US 2011/0261003 A1    Oct. 27, 2011

(30) Foreign Application Priority Data

Apr. 21, 2010    (KR) .......................... 10-2010-0037027

(51) Int. Cl.
*G06F 3/041*    (2006.01)

(52) U.S. Cl.
USPC ........ 345/173; 345/174; 345/156; 178/18.01; 178/18.06

(58) Field of Classification Search
USPC ............ 345/156, 173, 174; 178/18.01, 18.06, 178/18.07; 455/566
See application file for complete search history.

(56) References Cited

U.S. PATENT DOCUMENTS

| | | | | |
|---|---|---|---|---|
| 5,506,375 | A * | 4/1996 | Kikuchi ..................... | 178/18.07 |
| 2009/0201268 | A1 * | 8/2009 | Endo et al. .................... | 345/174 |
| 2010/0045625 | A1 * | 2/2010 | Yang et al. .................... | 345/173 |
| 2011/0032193 | A1 * | 2/2011 | Szalkowski .................. | 345/173 |
| 2011/0050625 | A1 * | 3/2011 | Kim et al. ..................... | 345/174 |
| 2011/0163965 | A1 * | 7/2011 | Hsu et al. ..................... | 345/173 |

FOREIGN PATENT DOCUMENTS

KR    1020070029786 A    3/2007
KR    100836749 B1    6/2008

OTHER PUBLICATIONS

Office Action from counterpart Korean Patent Application No. 1020100037027, mailed Jul. 26, 2011, 3 pages, English Summary included.

* cited by examiner

*Primary Examiner* — Lun-Yi Lao
*Assistant Examiner* — Priyank Shah
(74) *Attorney, Agent, or Firm* — Blakely Sokoloff Taylor & Zafman LLP

(57) ABSTRACT

Disclosed herein is a display device having a capacitive touch screen, including: a display unit; and a capacitive touch screen that is coupled to the display unit by an adhesive layer and includes a base substrate, a plurality of first electrode patterns that are formed on an active region of the base substrate, ground patterns that are formed on the active region of the base substrate and are separated from the first electrode pattern, a transparent insulating layer that covers the first electrode patterns and the ground patterns and is formed on the base substrate, and a plurality of second electrode patterns that are formed on an active region of the transparent insulating layer.

5 Claims, 4 Drawing Sheets

DISPLAY DEVICE HAVING CAPACITIVE TOUCH SCREEN

CROSS REFERENCE TO RELATED APPLICATION

This application claims the benefit of Korean Patent Application No. 10-2010-0037027, filed on Apr. 21, 2010, entitled "Display Device Having Capacitive Touch Screen", which is hereby incorporated by reference in its entirety into this application.

BACKGROUND OF THE INVENTION

1. Technical Field

The present invention relates to a display device having a capacitive touch screen.

2. Description of the Related Art

With the development of the mobile communication technology, user terminals such cellular phones, PDAs, and navigations can serve as a display unit that simply displays character information as well serve as a unit for providing various and complex multi-media such as audio, moving picture, radio internet web browser, etc. Therefore, electronic information terminals having a limited size require a larger display screen, such that a display using a touch screen scheme has become the main focus.

The touch screen has an advantage of saving a space by integrating a screen and a coordinate input unit, as compared to a key input type according to a prior art. Therefore, recently developed display apparatuses using the display with the touch screen have increased in use in consideration of the screen size and the user convenience.

A type of touch screen mainly used is largely classified into two types.

The first type is a resistive touch screen where upper/lower electrode layers are spaced from each other by a spacer and are disposed to contact each other by pressing. The second type is a capacitive touch screen where the upper substrate on which the first electrode pattern is formed and the lower substrate on which the second electrode pattern is formed are spaced from each other and the insulator is inserted therebetween to prevent the first electrode pattern from contacting the second electrode pattern. Research into the capacitive touch screen has been actively undertaken due to the recent high demand for a multi-touch.

However, the capacitive touch screen may be easily affected by electrical noise from the outside. In particular, the display device having a capacitive touch screen is affected by electrical noise generated from a display unit and causes malfunction frequently.

The display device having the capacitive touch screen according to the prior art uses a method to insert a ground layer or an air gap layer between the touch screen and the display unit, in order to solve the problem. However, it increases the thickness of the display device having the capacitive touch screen according to the prior art, which makes it difficult to provide a slim display device.

SUMMARY OF THE INVENTION

The present invention has been made in an effort to provide a display device having a capacitive touch screen with a slim structure that can prevent noise approaching second electrode patterns by simultaneously forming first electrode patterns and ground patterns on a base substrate.

A display device having a capacitive touch screen according to a preferred embodiment of the present invention includes: a display unit; and a capacitive touch screen that is coupled to the display unit by an adhesive layer and includes a base substrate, a plurality of first electrode patterns that are formed on an active region of the base substrate, ground patterns that are formed on the active region of the base substrate and are separated from the first electrode patterns, a transparent insulating layer that covers the first electrode patterns and the ground patterns and is formed on the base substrate, and a plurality of second electrode patterns that are formed on an active region of the transparent insulating layer.

Further, the second electrode patterns include second sensing units and a second connection unit, and the second sensing units are stacked on the same line as the ground patterns formed on the lower side of the transparent insulating layer.

Further, the second sensing unit has an area smaller than that of the ground pattern.

Further, the capacitive touch screen has the first electrode patterns and the second electrode patterns made of a conductive polymer.

Further, the conductive polymer is any one of polythiophene, polypyrrole, polyaniline, polyacetylene, and polyphenylene polymers.

Further, the capacitive touch screen further includes a protective layer that covers the second electrode patterns and is formed on the transparent insulating layer.

Further, the adhesive layer is formed of a double-sided adhesive sheet that is positioned on an inactive region of the capacitive touch screen so that an air gap is formed between the display unit and the capacitive touch screen.

DESCRIPTION OF THE PREFERRED EMBODIMENTS

Figure 1:
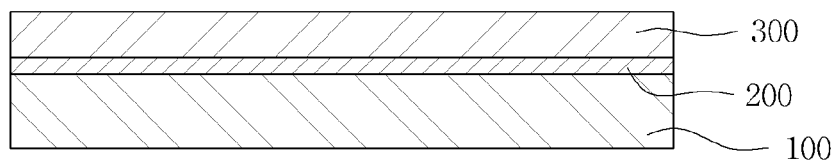
FIG. 1 is a cross-sectional view of a display device having a capacitive touch screen according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description will be omitted.

Hereinafter, the preferred embodiments of the present invention will be described in detail with reference to the accompanying drawings.

FIG. 1 is a cross-sectional view of a display device having a capacitive touch screen according to a first preferred embodiment of the present invention. Hereinafter, a display device having a capacitive touch screen according to the present embodiment will be described with reference to FIG. 1.

As shown in FIG. 1, a display device having a capacitive touch screen 10 includes a display unit 100 and a capacitive touch screen 300 that is coupled to the display unit 100 by an adhesive layer 200.

A liquid crystal display (LCD) panel or an organic light emitting diode (OLED) panel may be used as the display unit 100.

The LCD panel includes a backlight unit, a polarizer, and a liquid crystal panel. In contrast, the OLED panel includes a self light emitting organic material that emits light using electroluminescence (EL) phenomenon in which a fluorescent organic compound emits light in response to a current passed through it, such that a backlight unit is not required.

The capacitive touch screen 300 is coupled to the upper portion of the display unit 100 by the adhesive layer 200, wherein the adhesive layer may use a transparent optical adhesive. The adhesive layer 200 may be partially or entirely formed on the bonded surface of the display unit 100 and the capacitive touch screen 300.

In addition, the capacitive touch screen 300 used in the present invention has a plurality of first electrode patterns 320 and ground patterns 330 simultaneously formed on a base substrate 310, wherein the ground patterns 330 functions as shielding layers that prevent noise generated from the display unit 100 from approaching second electrode patterns 350. This will be described in detail with reference to FIGS. 2 to 4.

Figure 2:
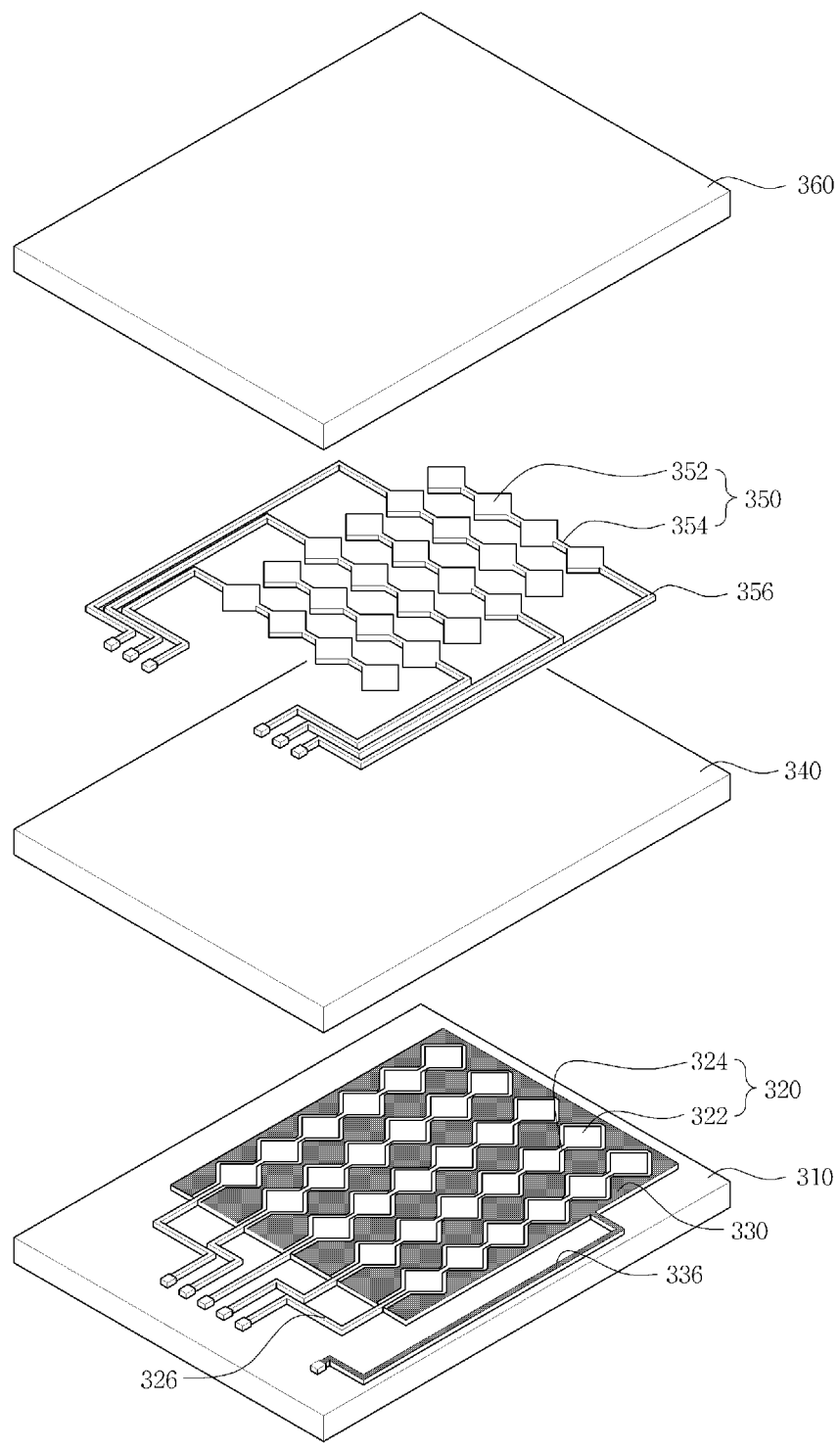
FIG. 2 is an exploded perspective view of a capacitive touch screen that can be used in FIG. 1.
Figure 3:
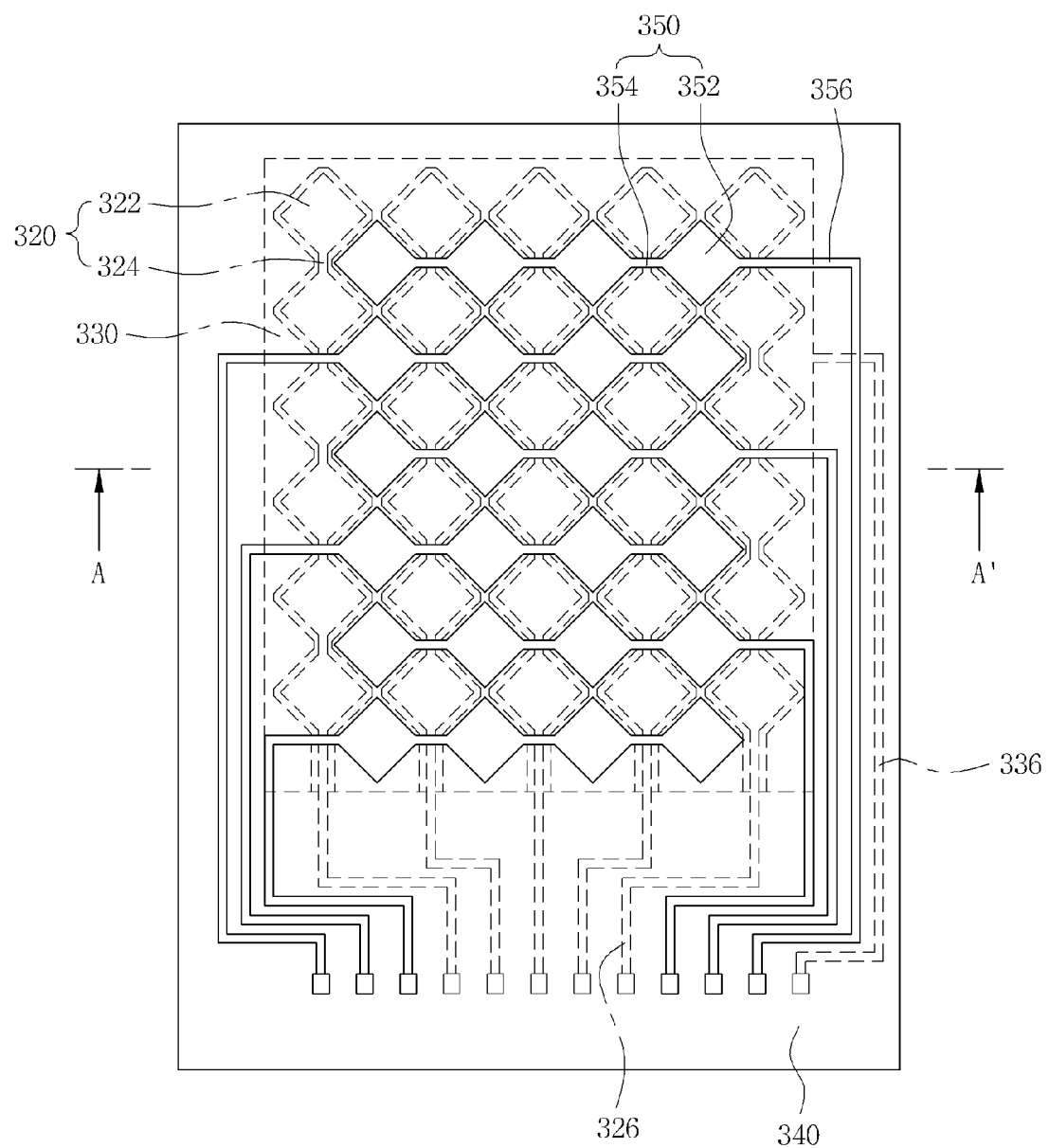
FIG. 3 is a plan view of the capacitive touch screen that can be used in FIG. 1.
Figure 4:
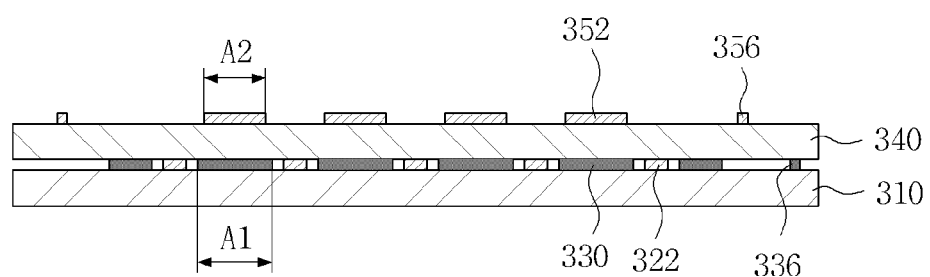
FIG. 4 is a cross-sectional view of the capacitive touch screen of FIG. 3.

FIG. 2 is an exploded perspective view of a capacitive touch screen that can be used in the display device having the capacitive touch screen according to the first preferred embodiment of the present invention, FIG. 3 is a plan view of the capacitive touch screen that can be used in FIG. 1, and FIG. 4 is a cross-sectional view of the capacitive touch screen of FIG. 3. As shown in FIG. 2, a capacitive touch screen 300 according to the present invention includes a base substrate 310, first electrode patterns 320 and ground patterns 330 that are formed on the base substrate 310, a transparent insulating layer 340 that is formed on the base substrate 310, and second electrode patterns 350 that are formed on the transparent insulating layer.

At this time, the base substrate 310 may use a glass substrate or a film substrate, made of transparent members and having a predetermined strength. The material of the film substrate is not particularly limited, but may include polyethylenetherephthalate (PET), polymethylmethacrylate (PMMA), polypropylene (PP), polyethylene (PE), polyethylenenaphthalate (PEN), polycarbonate (PC), polyethersulfone (PES), polyimide (PI), polyvinyl alcohol (PVA), cyclic olefin copolymer (COC), styrene polymer, polyethylene, polypropylene, and so on.

The plurality of first electrode patterns 320 are formed on an active region of the base substrate 310. At this time, the active region is a region of a touch screen through which images generated from the display unit 100 pass.

The plurality of first electrode patters 320 are formed in parallel in a first direction (Y direction). The first electrode pattern 320 includes first sensing units 322 that sense the to change in capacitance when a user's finger touches the touch screen, together with a second electrode patter 350 to be described below, and a first connection unit 324 that connects the adjacent sensing units. Meanwhile, although the first sensing unit 322 having a diamond shape is shown in FIG. 2, it is shown by way of example only and therefore, may have other shapes.

At this time, the first electrode pattern 320 is made of a transparent conductive material. For example, the material of the first electrode patter 320 may include indium tin oxide (ITO), tin oxide ($SnO_2$), indium oxide ($In_2O_3$), and a conductive polymer. The conductive polymer may use polythiophene, polypyrrole, polyaniline, polyacetylene, polypheylene, etc. as organic-based compounds. In particular, PEDOT/PSS compound among the polythiophene-based organic compounds is most preferable and one or more mixture among the organic-based compounds may be used. Further, when carbon nanotubes, etc., is further added to the organic compounds, conductivity may be further increased. The conductive polymer is manufactured at low costs and is proper for a touch screen formed integrally with a flexible display unit.

As shown in FIG. 2, the first electrode wirings 326 are connected to one ends of the first electrode patterns 320. The first electrode wiring 326 is made of metal (for example, silver (Ag)), and is disposed to be collected at a connection unit formed on an edge of the base substrate 310, thereby being connected to a capacitance sensing unit (not shown) by a FPCB (not shown).

Further, the ground patterns 330 are formed on the base substrate 310 in the same manner as the first electrode patterns 320 formed on the active region. The ground pattern 330 may be made of the same material as that of the first electrode pattern 320, but it is separated from the first electrode pattern 320.

The ground pattern 330 is a ground layer that prevents electrical noise generated from the display unit 100 from interfering in the touch screen 300. The ground pattern 330 is formed, integrally fitting into the empty space of the base substrate 310 in which the first electrode pattern 320 is not formed. The ground pattern 330 can be connected to the ground layer of the display device through a ground wiring 336 connected from one point of the ground pattern 330.

The transparent insulating layer 340 covers the first electrode patterns 320 and the ground patterns 330 and is formed on the base substrate 310.

As shown in FIG. 3 and FIG. 4, the transparent insulating layer 340 is made of a material (for example, a glass substrate, a film substrate or the like) that electrically separates and spatially spaces the first electrode patterns 320 from second electrode patterns 350 to be described below. The transparent insulating layer 340 is attached to the base substrate 310 by a transparent optical adhesive so as to cover the plurality of first electrode patterns 320 and the ground patterns 330.

Further, a plurality of second electrode patterns 350 are formed on an active region of the transparent insulating layer 340 through which images generated from the display unit 100 pass.

The plurality of second electrode patterns 350 are formed in parallel in a second direction (X direction) intersecting with the first electrode patterns 320, and include second sensing units 352 and a second connection unit 354. Further, the material of the second electrode pattern 350 may also include indium tin oxide (ITO), tin oxide ($SnO_2$), indium oxide ($In_2O_3$), and a conductive polymer.

Second electrode wirings 356 are connected to the second electrode patterns 350 to be collected at a connection unit that is formed at the edge of the transparent insulating layer 340. The second electrode wirings 356 are connected to a voltage source of the display device at the connection unit through a FPCB to supply constant voltage to the second electrode patterns 350.

At this time, as shown in FIG. 3 and FIG. 4, the second sensing units 352 of the second electrode patterns 350 may be stacked so as to be positioned on the same line as the ground patterns 330 formed on the lower side of the transparent insulating layer 340. The to plurality of first electrode patterns 320 are formed in parallel in a Y direction and the plurality of second electrode patterns 350 are formed in parallel in a X direction, being spaced from the transparent insulating layer 340, wherein the first sensing units 322 of the first electrode patterns 320 and the second sensing units 352 of the second electrode patterns 350 are spaced from each other so as not to be overlapped.

The reason is that the second sensing units 352 are positioned on the same line as the ground patterns 330 formed between adjacent first electrode patterns 320 to be spaced by the transparent insulating layer 340.

The ground patterns 330 of the capacitive touch screen 300 having the structure described above prevent noise generated from the display unit 100 from approaching the second sensing units 352 of the second electrode patterns 350.

Therefore, in order to improve efficiency of removing noise approaching the second sensing unit 352, it is preferable that the second sensing unit 352 has an area smaller than that of the ground pattern 330. At this time, the width A1 of the ground pattern 330 is longer than the width A2 of the second sensing unit 352, as shown in FIG. 4.

The capacitive touch screen 300 further includes a protective layer 360 formed on the transparent insulating layer 340 so as to cover the second electrode patterns 350. The protective layer 360 may be formed of a glass substrate or a film substrate similar to the base substrate 310. The protective layer 360 protects the second electrode patterns 350 from the outside and forms a contact surface contacted by a user's finger, etc. The bottom surface of the protective layer 360 is bonded to the transparent insulating layer 340 using an optical adhesive therebetween.

Figure 5:
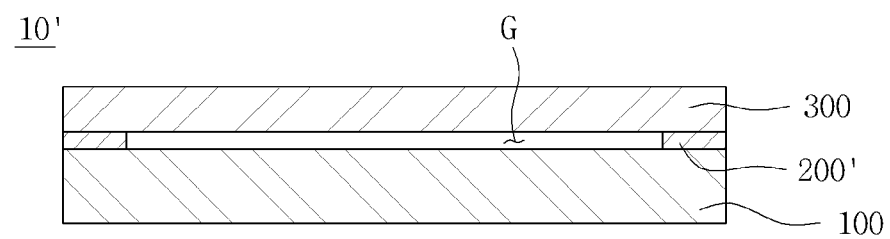
FIG. 5 is a cross-sectional view of a display device having a capacitive touch screen according to a second preferred embodiment of the present invention.

FIG. 5 is a cross-sectional view of a display device having a capacitive touch screen according to a second preferred embodiment of the present invention. Hereinafter, a display device having a capacitive touch screen according to the present embodiment will be described with reference to FIG. 5. A detailed description of the same configuration as that described with reference to FIGS. 1 to 4 will be omitted.

In a display device having capacitive touch screen 10' according to the present embodiment, an adhesive layer 200' formed between a display unit 100 and a capacitive touch screen 300 is a double-sided adhesive sheet formed on an inactive region of the capacitive touch screen 300.

When the adhesive layer 200' is formed over the bottom surface of the base substrate 310, adhesion with the display unit 100 is improved but efficiency of removing noise is reduced.

In order to solve the problem, the adhesive layer 200' according to the present embodiment is formed of a double-sided adhesive sheet and is formed on the inactive region of the capacitive touch screen 300 to space the display unit 100 from the capacitive touch screen 300 at a predetermined interval and form an air gap G in the active region of the bottom surface of the base substrate 310, thereby making it possible to improve efficiency of removing noise.

According to the present invention, the ground patterns are inserted between the display unit and the capacitive touch screen to remove the electrical noise approaching the electrode patterns of the capacitive touch screen, thereby making it possible to prevent the malfunction.

Further, according to the present invention, the air gap layer is further included between the ground patterns and the display unit, thereby making it possible to remove the electrical noise approaching the capacitive touch screen.

Further, according to the present invention, the first electrode patterns and the ground patterns are formed on the same plane, thereby making it possible to implement the display device having the capacitive touch screen having a slim structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, to additions and substitutions should also be understood to fall within the scope of the present invention.

What is claimed is:

1. A display device having a capacitive touch screen, comprising:
   a display unit; and
   a capacitive touch screen that is coupled to the display unit by an adhesive layer and includes a base substrate, a plurality of first electrode patterns that are formed on an active region of the base substrate, ground patterns that are formed on the active region of the base substrate and are separated from the first electrode patterns, a transparent insulating layer that covers the first electrode patterns and the ground patterns and is formed on the base substrate, and a plurality of second electrode patterns that are formed on an active region of the transparent insulating layer,
   wherein the ground patterns are structured as shielding layers to reduce noise generated from the display unit from reaching second electrode patterns which include sensing units being stacked on the same line as the ground patterns formed on the lower side of the transparent insulating layer and having an area smaller than that of the ground pattern.

2. The display device as set forth in claim 1, wherein the capacitive touch screen has the first electrode patterns and the second electrode patterns made of a conductive polymer.

3. The display device as set forth in claim 2, wherein the conductive polymer is any one of polythiophene, polypyrrole, polyaniline, polyacetylene, and polyphenylene polymers.

4. The display device as set forth in claim 1, wherein the capacitive touch screen further includes a protective layer that covers the second electrode patterns and is formed on the transparent insulating layer.

5. The display device as set forth in claim 1, wherein the adhesive layer is formed of a double-sided adhesive sheet that is positioned on an inactive region of the capacitive touch screen so that an air gap is formed between the display unit and the capacitive touch screen.

* * * * *